F. A. G. PIRWITZ.
PHOTOGRAPHIC SHUTTER.
APPLICATION FILED APR. 5, 1919.

1,307,751.

Patented June 24, 1919.
5 SHEETS—SHEET 1.

Witnesses:
Nelson H. Copp

INVENTOR
Friedrich A. G. Pirwitz
BY
his ATTORNEYS

F. A. G. PIRWITZ.
PHOTOGRAPHIC SHUTTER.
APPLICATION FILED APR. 5, 1919.
1,307,751.
Patented June 24, 1919.
5 SHEETS—SHEET 2.
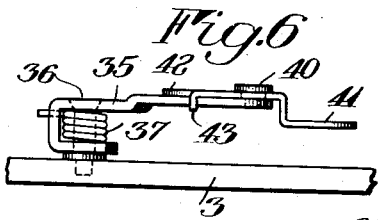
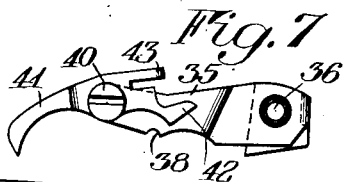
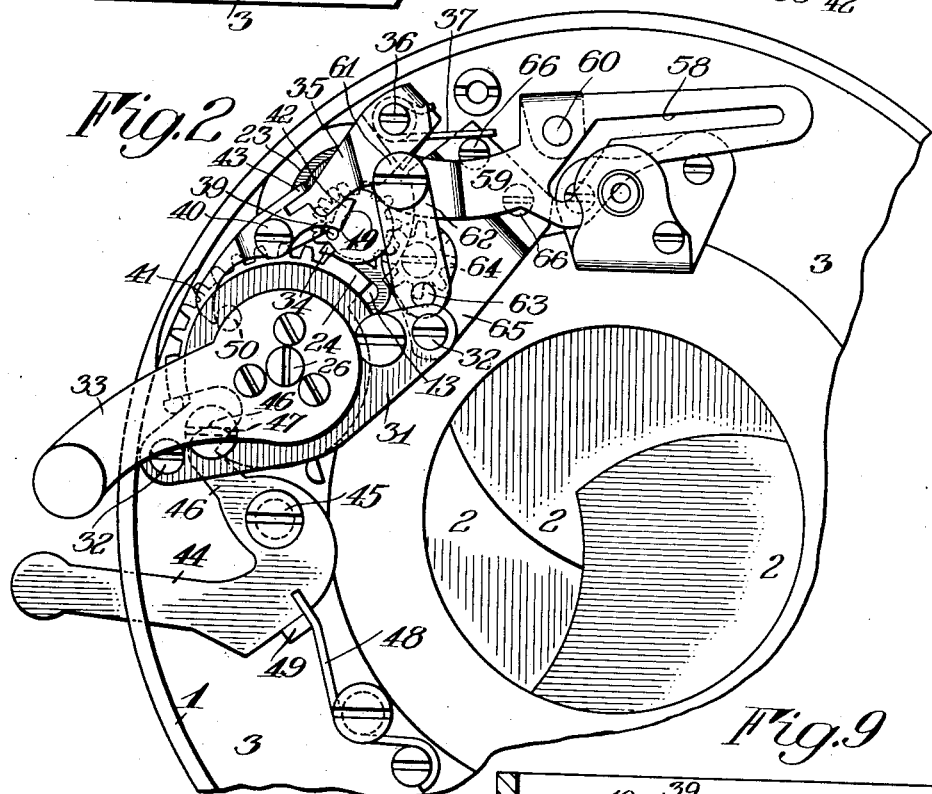
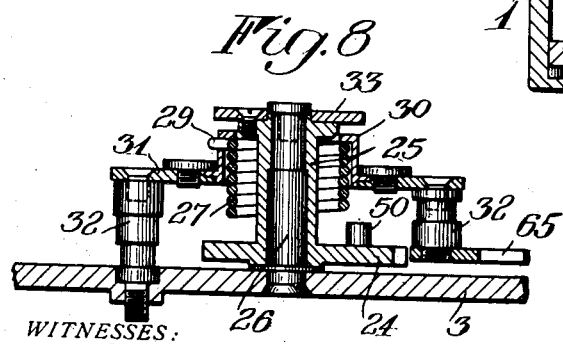
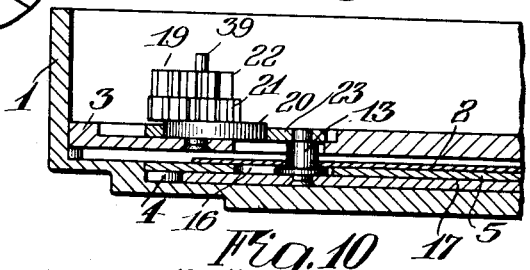
WITNESSES:
INVENTOR
Friedrich A. G. Pirwitz
BY
his ATTORNEYS F. A. G. PIRWITZ.
PHOTOGRAPHIC SHUTTER.
APPLICATION FILED APR. 5, 1919.
1,307,751.
Patented June 24, 1919.
5 SHEETS—SHEET 3.
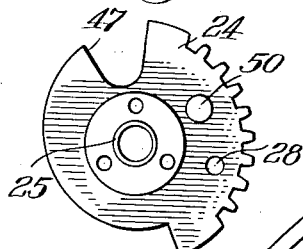
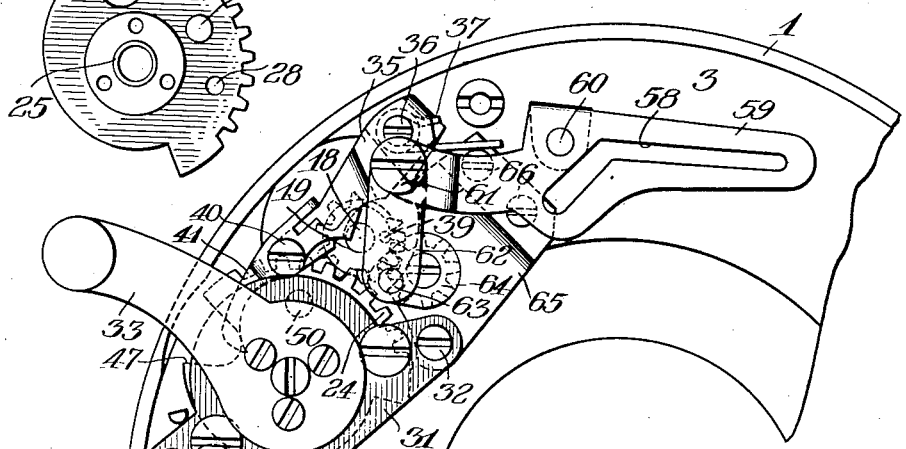
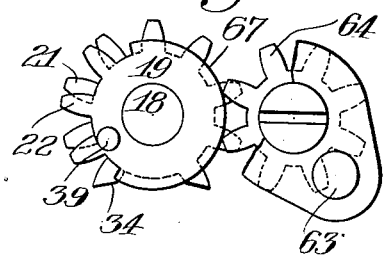
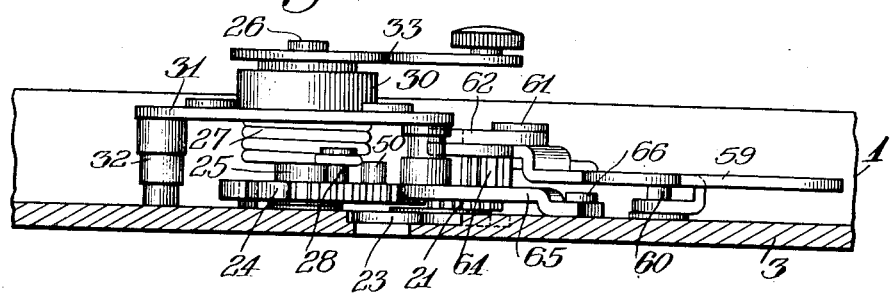
WITNESSES:
Nelson H. Copp
Russell B. Griffiths
INVENTOR
Friedrich A. G. Pirwitz
BY
his ATTORNEYS

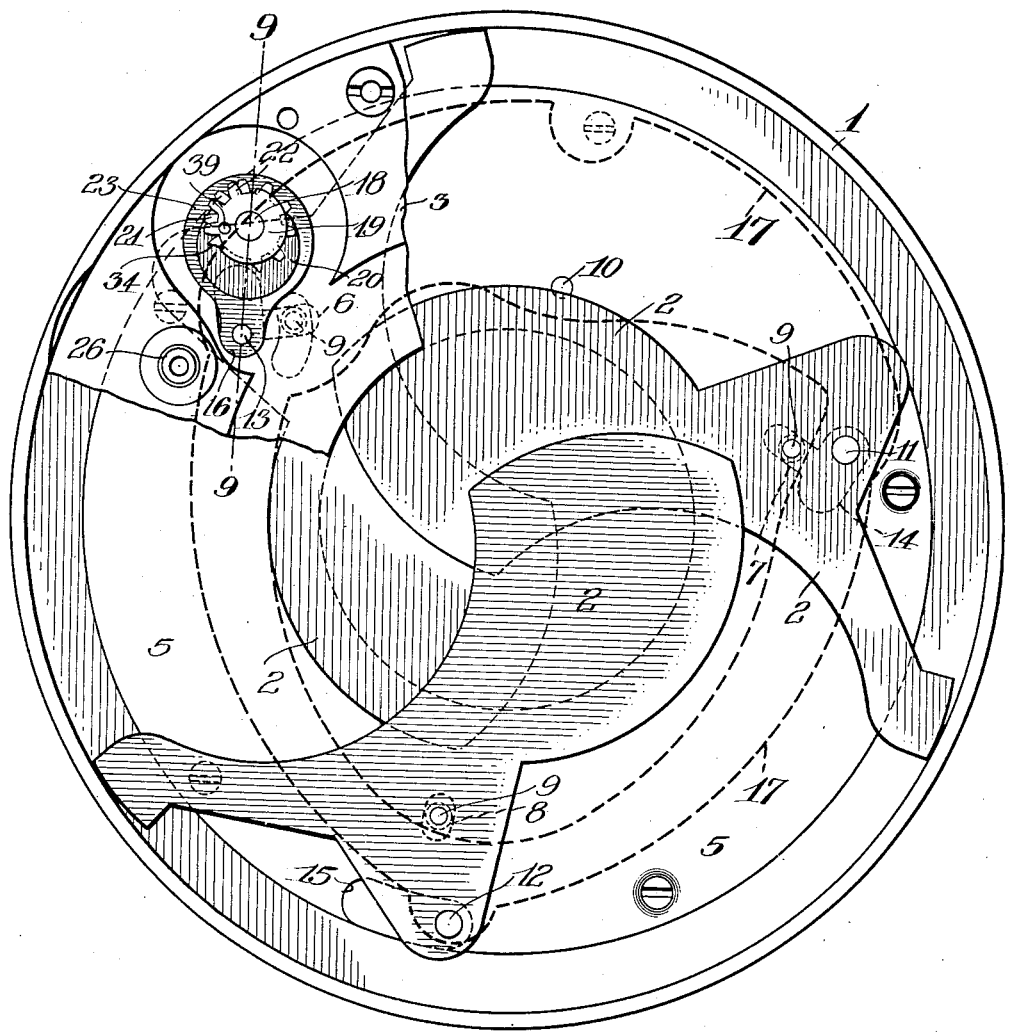

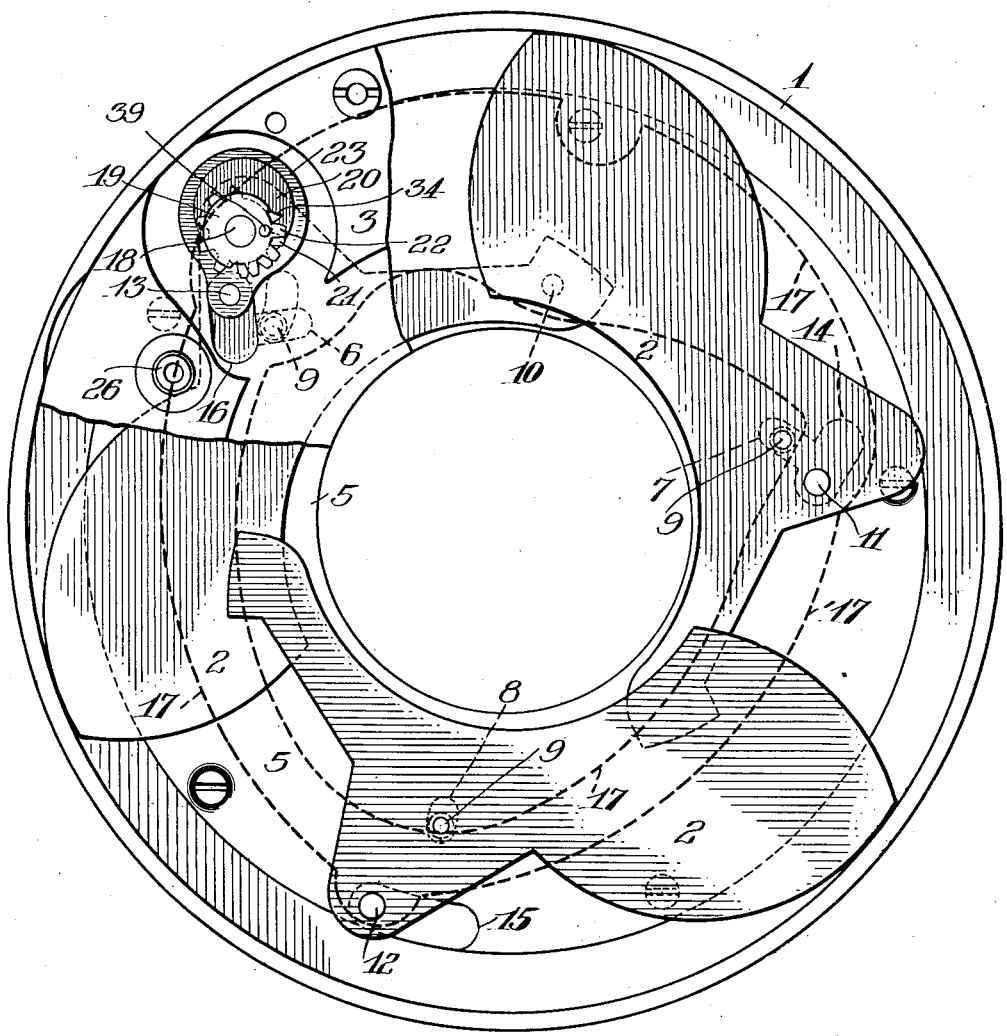

UNITED STATES PATENT OFFICE.

FRIEDRICH A. G. PIRWITZ, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

1,307,751.     Specification of Letters Patent.     Patented June 24, 1919.

Application filed April 5, 1919. Serial No. 287,784.

*To all whom it may concern:*

Be it known that I, FRIEDRICH A. G. PIRWITZ, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference numerals marked thereon.

My present invention relates to photography and more particularly to photographic shutters of the blade type and it has for one of its objects to provide a simple and durable shutter that will be acceptable from a manufacturing standpoint and permit the maker to turn out a uniform product readily assembled and requiring little if any tuning up or individual adjustments. I have largely reduced the number of springs required in the mechanism and the improvements are directed in part toward perfecting the blade actuating mechanism, the mode of transmitting motion to the retarding mechanism and the coupling of these mechanisms to the driving means. To these and other ends the invention resides in certain improvements and combinations of parts all as will be hereinafter more fully described, the novel features being pointed out in the claims at the end of the specification.

In the drawings:

Fig. 2 is a similar but fragmentary view with most of the retarding mechanism removed and showing the positions of the parts when the shutter is wound or set;

Fig. 3 is a view similar to Fig. 2 showing the positions of the parts during the operation of the shutter after it is released;

Fig. 4 is a front view of the blade mechanism when the shutter is closed;

Fig. 5 is a similar view with the shutter open;

Fig. 6 is a side view in detail of a latch employed to lock certain parts;

Fig. 7 is a top view of the same latch;

Fig. 8 is a section on the line 8—8 of Fig. 1;

Fig. 9 is a section on the line 9—9 of Fig. 4;

Fig. 10 is a section on the line 10—10 of Fig. 1;

Fig. 11 is a detail view of the motor or master member;

Fig. 12 is an enlarged detail view of the gearing between the driving member and the retarding mechanism, and Fig. 13 is a fragmentary section taken on the line 13—13 of Fig. 1 and looking in the direction of the arrows to show a group of the operating mechanism in side elevation.

Similar reference numerals throughout the several views indicate the same parts.

Figure 1:
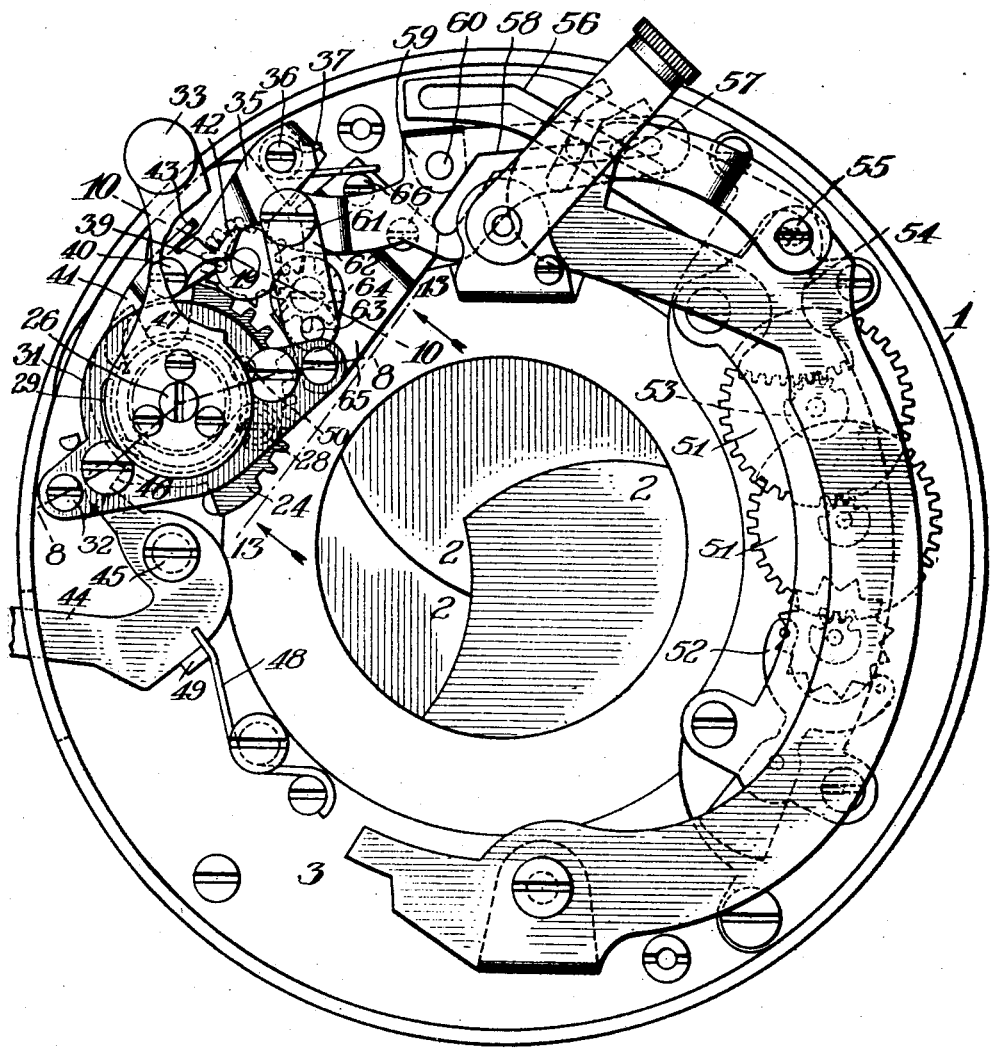
Figure 1 is a front view of a shutter mechanism constructed in accordance with and illustrating one embodiment of my invention, the front or cover plate being removed to reveal interior parts which are in normal position.

I have embodied herein no views of the exterior of the shutter for the reason that my invention has reference only to the interior mechanism which is housed, as usual, in an annular casing 1 closed by a front or cover plate not shown, but which would have the usual dials or scales and the usual setting and adjusting devices for both shutter and diaphragm.

I will first describe the blade mechanism and, referring more particularly to Figs. 4 and 5, blades 2 are located in the bottom or rear of the casing as usual in pivoted blade symmetrically opening shutters, and are covered by an annular partition member 3 a fragment of which is shown in Figs. 4 and 5 and the whole of which is shown in Fig. 1. Beneath this partition plate and arranged in a recess 4 of the casing, as shown in Fig. 9, is a fixed ring 5 having slots 6, 7 and 8 therein that form slightly elongated pivot bearings for pivots 9 carried by the blades which latter slide on top of the ring 5. On the under side of the said ring is pivoted at 10 an actuating yoke 17 that is shown in heavy dotted lines in Figs. 4 and 5, respectively, in two positions. Pivot pins 11, 12 and 13, fixed to this yoke extend through slots 14, 15 and 16, respectively, in the partition member 3 and engage the respective blades in which bearings are formed for them, so that as the actuating yoke 17 is vibrated on its pivot 10 between the positions of Figs. 4 and 5, it opens and closes the blades that swing on their respective pivots 9.

The pivot pin 13 for one of the blades is utilized as a connection for imparting motion to the actuator 17. Referring additionally to Figs. 9 and 10, there is fixed to the partition member 3 (which carries most of the mechanism hereinafter described) a stud 18 upon which turns a hub 19 hereinafter termed the driving member and which comprises an eccentric 20 and gears 21 and 22 all fixed relatively to each other and arranged in superposed relationship in the order named. Coöperating with the eccentric 20 is a strap 23 pivoted to a reduced portion of the blade actuating pivot 13. It will therefore be seen that each revolution of the driving member 19 will open and close the shutter, a half revolution through 180° opening or closing the blades, as illustrated by the positions of Figs. 4 and 5.

The motive force for operating this shutter resides in a master member 24 best shown for present purposes in Figs. 1, 8 and 11. It embodies a gear segment provided with a hub 25 turning on a fixed stud 26 on the partition member 3. The hub is encircled by a motor or winding spring 27, the lower end of which hooks onto a pin 28 on the master member while the other end reacts at 29 against a housing 30 (Fig. 8). This housing is supported by a plate 31 on posts 32 rising from the partition 3. The hub 25 terminates beyond the housing in a lever 33 which is the setting lever for the shutter extending to the exterior of the casing 1. To set it, it is moved from the position of Fig. 1 to that of Fig. 2.

The master member is in the plane of and adapted to mesh with the gear teeth 21 of the driving member 19, but the said gear 21 is a mutilated gear, as clearly shown in Fig. 12. In the present instance, one of the teeth is omitted and the adjacent teeth are beveled, as shown at 34 in said figure, to conform to the addendum line of the master member 24, so that the latter is adapted to pass the driving member 19 out of mesh therewith when in the normal position of Fig. 1 and while being wound to the left in that figure. The driving member 19 is normally locked in such position by a latch 35 shown in detail in Figs. 6 and 7 and pivoted at 36 to the partition plate 3 under the influence of a spring 37 that tends to hold notched locking shoulders 38 on the latch in engagement with a pin 39 on the driving member, preventing it from moving in either direction. Pivoted to and carried by the latch 35 at 40 is a lever 41 having a cam arm 42 later referred to and a down turned finger 43 adapted to lock with the latch lever 35 and hold the two levers for joint movement in one direction, although the lever 41 may move independently in the opposite direction.

When the master member is fully wound, as in Fig. 2, it is detained under tension by a shutter operating lever 44 extending to the exterior of the case, as usual, and pivoted at 45 to the partition member 3 which lever has a hooked portion 46 that snaps into detaining engagement with a shoulder 47 on the master member under the influence of a coil spring 48 fixed to the partition 3 and engaging the operating lever at 49. At the completion of such winding movement, the teeth on the master member 24 have traveled beyond the pitch line of the gear 21 of the driving member 19 and in doing so, a pin 50 on the master member engages and rocks the lever 41 which thereupon performs two functions: First, it locks by means of the finger 43 with the pivoted latch 35 and swings the locking shoulders 38 thereof out of engagement with the pin 39 on the driving member 19, freeing the latter, and, secondly, it at the same time kicks the said pin 39 by means of its cam arm 42, a short distance so that the first tooth of the gear 21 on the driving member is thrown across the addendum line and into the pitch line of the master member 24, so that the said gear is ready to mesh with and be turned one complete revolution by the master member, as shown in Fig. 2. This revolution through the eccentric 20 and straps 23 opens and closes the blades as previously described. Upon the release and operation of the shutter, the parts reassume the position of Fig. 1. The pin 39 on the driving member travels around and snaps back between the notched shoulders 38 of the latch 35 and in doing so, engages the cam arm 42 of the lever 41 and throws it out of the way until the pin 50 on the master member again straightens it out on the next winding movement.

The retarding mechanism through the use of which the operation of the blades is time controlled and a given exposure shortened or prolonged may, in general, be of any preferred form though with respect to certain features of the present invention, it should be one in which there is a retarding action in both directions as distinguished from a retarding action in one direction followed by an idle movement back to set position. In the present instance, I have shown a retarding device of the gear type which applies a drag on the movements of the operating mechanism by virtue of the inertia and friction of a train of gears indicated generally at 51 in Fig. 1 and terminating in a weighted escapement 52. The leading pinion 53 of the train meshes with a segment lever 54 pivoted at 55 and having a slotted arm 56 beyond the pivot. A shifting fulcrum pin 57 for varying the leverage exerted upon the train is slidable in this slotted arm 56 and also in the similar slotted arm 58 of a lever 59 pivoted at 60 to the partition member 3 and shown more clearly while disconnected in the other figures. A more complete description of this retarding mechanism now known in the art is thought not to be necessary to an understanding of the present invention, it being borne in mind merely that the rocking of the lever 59 in one direction or the other, alternately, gives equal retarding action.

In the practice of the present invention, this lever 59 is connected at 61 by a crank or link 62 with a crank pin 63 on a gear 64 which latter is of the form shown in Fig. 10. In either extreme or normal position of the lever 59 and its gear train, this pin is on a dead center at either the height or the depth of the stroke. The gear is mounted, in the present instance, upon a raised bracket 65 secured at 66 to the partition member and is in a position to mesh with the gear 22 on the driving member 19. This gear 22 as better shown in Fig. 12, is segmental or mutilated, containing, in the present instance, but three teeth. The remainder of the periphery has a partially cylindrical form as indicated at 67 and normally, as shown in Figs. 1 and 12, this cylindrical portion rides between two adjacent teeth of the gear 64 and locks it and all parts of the retarding mechanism with which it is connected for movement, against rotation or movement. When the shutter is operated and the driving member 19 rotated with the master member to the left in the figures, the gear 64 remains locked during the initial movement because of the distant position of the first of the three teeth on gear 22 which must travel an appreciable distance before going into mesh with said gear. It is during this period that the shutter blades open which gives an unopposed and hence rapid opening movement under the full strength of the motor spring 27 of the master member that is always desirable in a shutter. As soon as the blades open, the gear teeth 22 reach and mesh with gear 64 and through crank 62 the retarding mechanism applies its drag upon the driving energy of the spring of the master member while the blades remain open, thus timing the exposure. During this period, the eccentric strap 23 is passing its dead center. By the time the blades are ready to close, the gear segment 22 has left the gear 64 and the cylindrical portion 67 has gone into engagement to lock it, though the driving member 19 and its master member have not completed their cycles. During the remainder of the movement of the driving devices, the blades are quickly closed, unaffected by the retarding mechanism.

While I have illustrated my improvements in the present instance, as embodied in a symmetrically opening pivoted blade shutter of the set type, those skilled in the art will recognize that my invention as to some of its features, is applicable to automatic and other kinds of shutters.

I claim as my invention:

1. In a photographic shutter, the combination with a plurality of symmetrically opening blades and an actuating ring therefor, of a rotary driving member having an eccentric, and an eccentric strap on the latter connected to the ring.

2. In a photographic shutter, the combination with a plurality of symmetrically opening blades and an actuating ring therefor, of a retarding device, a rotary driving member geared thereto, an eccentric on the driving member and an eccentric strap connecting the latter with the actuating ring.

3. In a photographic shutter, the combination with a blade mechanism and a retarding device, of a driving member having an eccentric and having interrupted gearing connecting it with the retarding device and an eccentric strap connecting the driving member and blade mechanism.

4. In a photographic shutter, the combination with a blade mechanism and a retarding device, of a driving member operatively connected to the blade mechanism and having interrupted gearing connecting it with the retarding device.

5. In a photographic shutter, the combination with a blade mechanism and a retarding mechanism, of a driving member for both mechanisms embodying an eccentric and an eccentric strap connecting the latter with one of said mechanisms.

6. In a photographic shutter, the combination with a blade mechanism and a retarding mechanism, of a rotary driving member embodying a gear and an eccentric arranged in different transverse planes relatively to the axis of the member, the former being adapted to actuate the retarding device, and an eccentric strap on the eccentric connected to the blade mechanism.

7. In a photographic shutter, the combination with a blade mechanism and retarding mechanism, of a rotary driving member embodying two gears and an eccentric arranged in three different transverse planes relatively to the axis of the member, one of the gears being adapted to actuate the retarding device, a master member adapted to operate upon the other gear and an eccentric strap on the eccentric connected to the blade mechanism.

8. In a photographic shutter, the combination with a retarding mechanism embodying a gear, of a rotary driving member adapted to actuate the gear and also to directly lock the same while moving relatively thereto in contact therewith.

9. In a photographic shutter, the combination with a retarding mechanism embodying a member having a retarding action in two directions and a gear for actuating said member, of a driving member adapted to drive the gear and actuate the said retarding member in one direction and to then lock the gear by direct engagement therewith during a further movement of the driving member.

10. In a photographic shutter, the combination with a retarding mechanism embodying a gear, of a rotary driving member having teeth adapted to mesh with and drive the gear and also a peripheral portion adapted to ride between adjacent teeth of the gear and lock the latter during further movement of the driving member.

11. In a photographic shutter, the combination with a blade mechanism and an interrupted gear for driving the same, of a master member having a winding spring and adapted to mesh with the gear when released and to pass the interrupted portion thereof when wound.

12. In a photographic shutter, the combination with a blade mechanism and an interrupted gear for driving the same, of a master member having a winding spring and adapted to mesh with the gear when released and to pass the interrupted portion thereof when wound, and a latch under the control of the master member for locking the gear when out of mesh with the latter.

13. In a photographic shutter, the combination with a blade mechanism and an interrupted gear for driving the same, of a master member having a winding spring and adapted to mesh with the gear when released and to pass the interrupted portion thereof when wound, a latch under the control of the master member for locking the gear when out of mesh with the latter, and a device operated by the master member upon the completion of its winding movement for kicking the gear into meshing position.

14. In a photographic shutter, the combination with a blade mechanism and an interrupted gear for driving the same, of a master member having a winding spring and adapted to mesh with the gear when released and to pass the interrupted portion thereof when wound, a device operated by the master member upon the completion of its winding movement for kicking the gear into meshing position, and a latch released by the master member through the medium of said device upon the completion of the winding movement of the master member for locking the gear when out of mesh with the latter.

15. In a photographic shutter, the combination with a blade mechanism and an interrupted gear for driving the same, of a master member having a winding spring and adapted to mesh with the gear when released and to pass the interrupted portion thereof when wound, a latch under the control of the master member for locking the gear when out of mesh with the latter and a device carried by the latch and operated together therewith by the master member upon the completion of its winding movement for kicking the gear into meshing position.

16. In a photographic shutter, the combination with a blade mechanism and an interrupted gear for driving the same having a pin thereon, of a master member having a winding spring and adapted to mesh with the gear when released and to pass the interrupted portion thereof when wound, a pivoted latch adapted to engage the pin on the gear and lock the latter when out of mesh with the master member and a lever pivoted to the latch and adapted to be actuated by the master member upon the completion of its winding to release the latch and to kick the gear into meshing position.

17. In a photographic shutter, the combination with a blade mechanism and an interrupted gear for driving the same, of a master member having a winding spring and adapted to mesh with the gear when released and to pass the interrupted portion thereof when wound, and a device actuated by the master member upon the completion of its winding movement for kicking the gear into meshing position.

18. In a photographic shutter, the combination with a blade mechanism and driving means therefor, of a master member having a winding spring and adapted to coöperate with the driving means when released but to clear the same when wound and a device actuated by the master member upon the completion of its winding movement for shifting the driving means back into the path of the master member.

19. In a photographic shutter, the combination with a blade mechanism, a spring actuated master member and a driving member for the blade mechanism adapted to be operated by the master member when the latter is released and to be disconnected therefrom when the master member is wound, means under the control of the master member for locking the driving member in inoperative position, and a device actuated by the master member upon the completion of its winding movement for operatively connecting the driving member therewith.

20. In a photographic shutter, the combination with a blade mechanism and a rotary driving member therefor, of a master member adapted to turn the driving member intermittently in one direction and means under control of the master member for locking the driving member during the intervals.

FRIEDRICH A. G. PIRWITZ.